Figure 1:
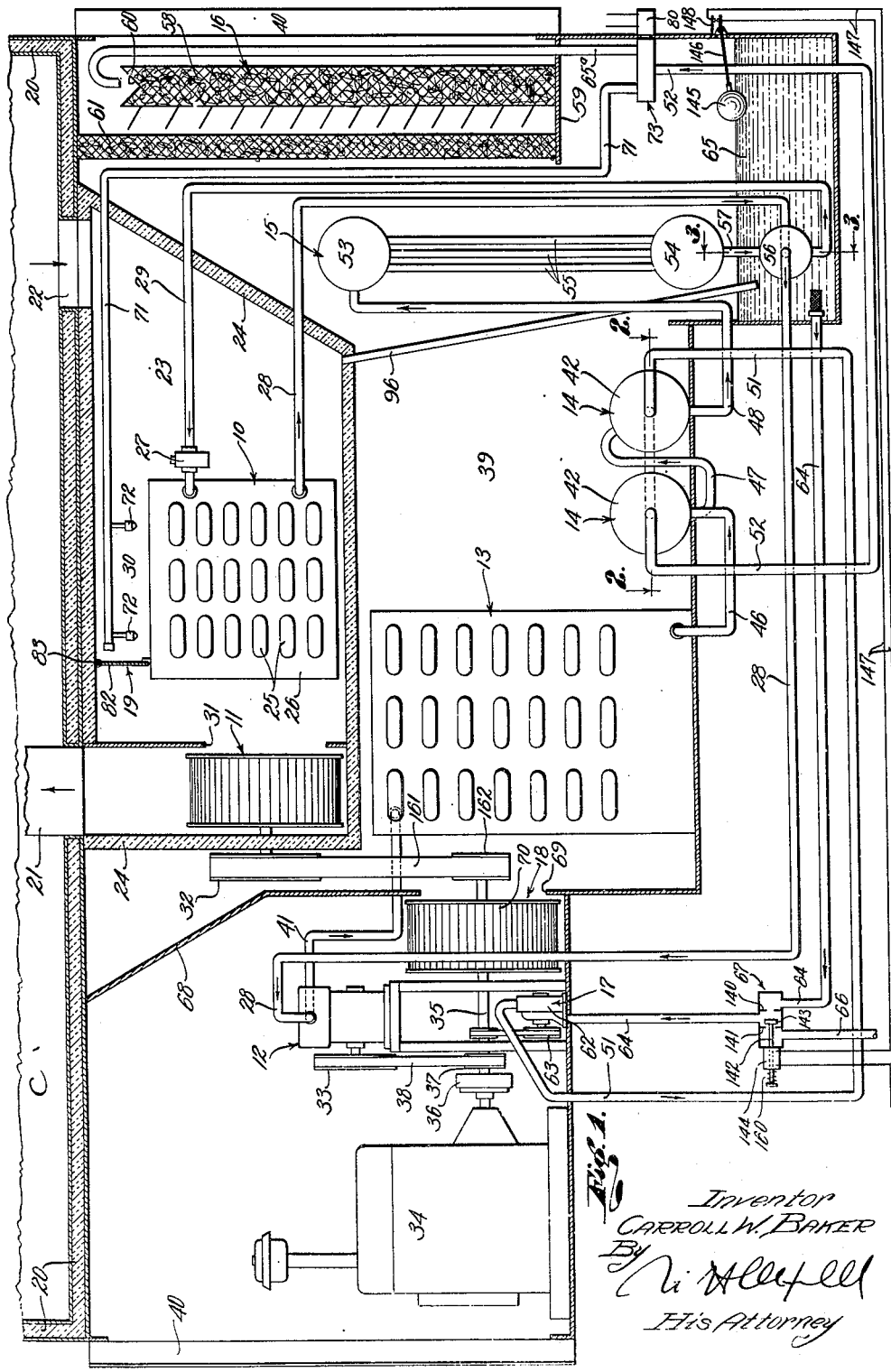

July 6, 1943.   C. W. BAKER   2,323,511
REFRIGERATING AND AIR CONDITIONING APPARATUS
Filed Oct. 24, 1941   3 Sheets-Sheet 1

Inventor
CARROLL W. BAKER
By
His Attorney

July 6, 1943.  C. W. BAKER  2,323,511
REFRIGERATING AND AIR CONDITIONING APPARATUS
Filed Oct. 24, 1941   3 Sheets-Sheet 3
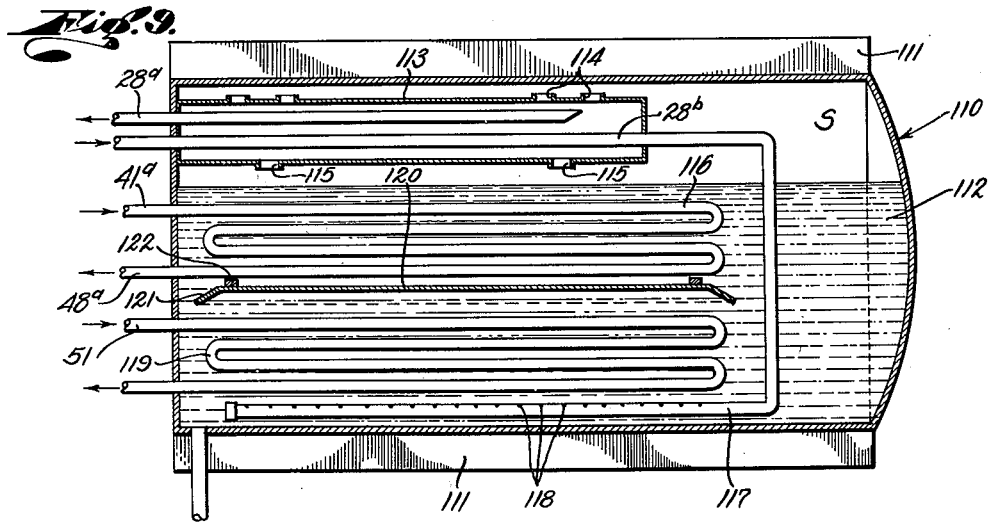
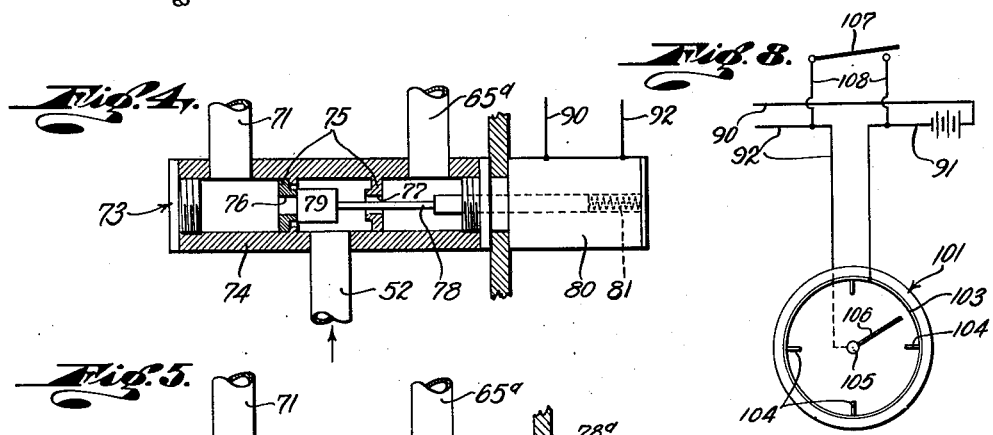
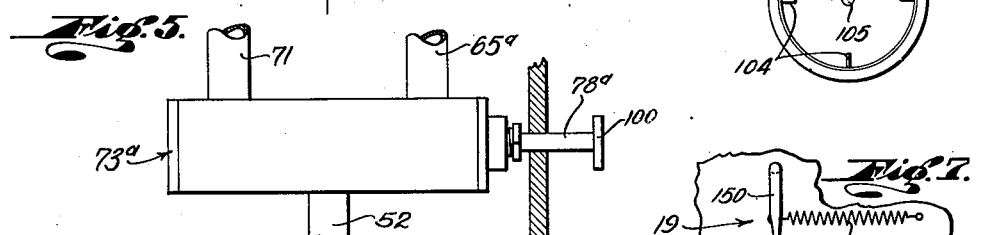
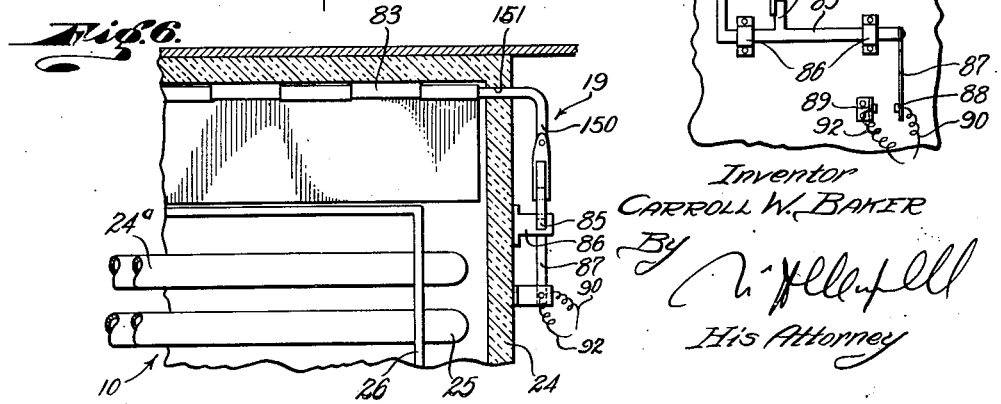
Inventor
CARROLL W. BAKER
By
His Attorney Patented July 6, 1943

2,323,511

UNITED STATES PATENT OFFICE 2,323,511

REFRIGERATING AND AIR CONDITIONING APPARATUS

Carroll W. Baker, Los Angeles, Calif.

Application October 24, 1941, Serial No. 416,366

9 Claims. (Cl. 62—129)

This invention relates to refrigerating and air conditioning apparatus and relates more particularly to apparatus of this nature suitable for use on refrigerated trucks, passenger carrying buses and other vehicles as well as for stationary installations. A general object of this invention is to provide a practical, highly efficient refrigerating and air conditioning apparatus.

Another object of this invention is to provide a refrigerating and air conditioning apparatus embodying novel and very effective means for defrosting the evaporator.

It is universally recognized that the accumulation of ice or snow on the coils, etc. of the evaporator of refrigerating apparatus greatly reduces the efficiency of the apparatus. The problem of defrosting is of particular importance in the successful operation of the refrigerating apparatus employed on refrigerated trucks carrying produce at below-zero temperatures. When long hauls are made it is often necessary to defrost the evaporator several times during a single trip. At the present time no provision is made for the periodic or automatic defrosting of the evaporator and it is purely a manual operation performed at the driver's discretion. The refrigerating apparatus is shut down for a substantial period to allow the evaporator to defrost and the apparatus is again put into operation when the driver or operator believes the evaporator to be fully defrosted. It is impossible for the driver or operator to determine when the evaporator needs defrosting and to determine when the evaporator has been fully defrosted. When the evaporator coils are located in the storage compartment, as they are in most refrigerated vehicles, the apparatus must be shut down for a period of time sufficient to allow the temperature of the entire compartment to rise above freezing with additional time for the snow to melt from the evaporator coils. In practice, this requires a long interruption in the refrigeration, particularly where a frozen load is being carried and, in many cases, there is an interruption lasting for several hours.

An object of this invention is to provide a refrigerating apparatus useful on refrigerated trucks, air conditioned buses and other places, in which the evaporator or freezing coils may be fully defrosted in a minute or two without shutting down or interrupting operation.

Another object of this invention is to provide a refrigerating or air conditioning apparatus in which the evaporator is fully defrosted without the necessity of increasing the temperature of the cold compartment or storage compartment to any substantial degree or for a long period of time.

Another object of this invention is to provide a refrigerating and air conditioning apparatus having means for automatically defrosting the evaporator at regular intervals to provide for the most efficient operation.

Another object of this invention is to provide a refrigerating or air conditioning apparatus of the character referred to embodying a novel automatic control for the defrosting means operable either by a timing mechanism or by an automatic system responsive to the frost or snow condition at the evaporator. With the automatic control system of this invention the evaporator is defrosted whenever the accumulation of snow on the evaporator restricts the passage of air through or around the evaporator to a given degree.

Another object of this invention is to provide a refrigerating or air conditioning apparatus of the character mentioned which employs the water of the cooling system to defrost the evaporator. The apparatus of this invention embodies an evaporative cooling system providing cool air to cool the condenser, the liquid receiver and the heat exchangers and the water from the evaporative cooler is circulated through the heat exchangers where it absorbs substantial heat and this heated water is sprayed upon the evaporator under the control of the automatic system to defrost the evaporator in a minimum time. The heated or warm water of the cooling system is operative to defrost the evaporator in a minute or two. The melted snow or water of condensation from the evaporator is delivered to the water of the cooling system in a cold state to increase the efficiency of the cooling system.

Another object of this invention is to provide a refrigerating or air conditioning apparatus embodying a heat exchange means in series with the condenser. The series relation between the heat exchanger and the condenser provides for the exchange of heat between the cool water from the evaporative cooler and the refrigerant travelling on its way from the condenser to the receiver. The water cooled at the evaporative cooler serves to reduce the temperature of the refrigerant at the exchangers. The evaporative cooler further cools the air which in turn cools the condenser and the liquid refrigerant receiver.

Another object of this invention is to provide an apparatus of the character referred to in which the liquid refrigerant passing from the liquid receiver to the evaporator is cooled by the water in the sump of the evaporative cooler and by the returning gaseous refrigerant leaving the evaporator to greatly increase the refrigerating effect at the evaporator.

A further object of this invention is to provide a refrigerating or air conditioning apparatus of the character referred to embodying an absorber where the returning gaseous refrigerant from the evaporator is absorbed by an aqueous solution and from which the vaporous refrigerant solution is drawn by the compressor, which absorber is equipped with a dehydrator embodying a coil or conduit carrying the cold returning refrigerant serving to condense the water from the vapor at the point of vapor intake, thus materially reducing the proportion of water vapor carried through the refrigerant system.

Figure 2:
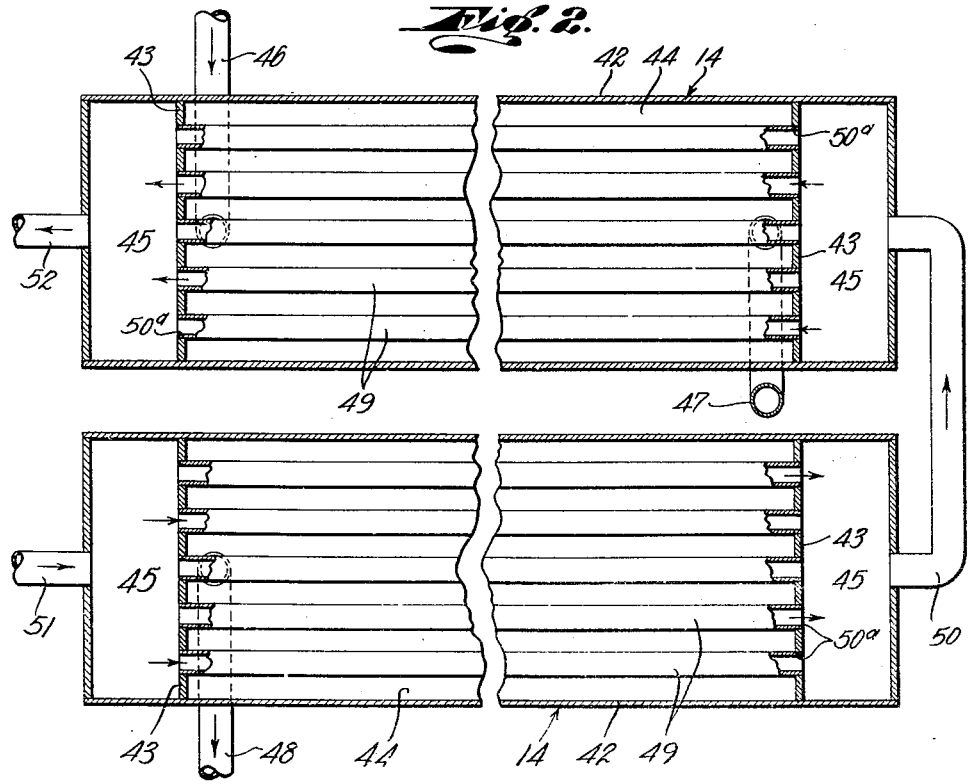
Figure 3:
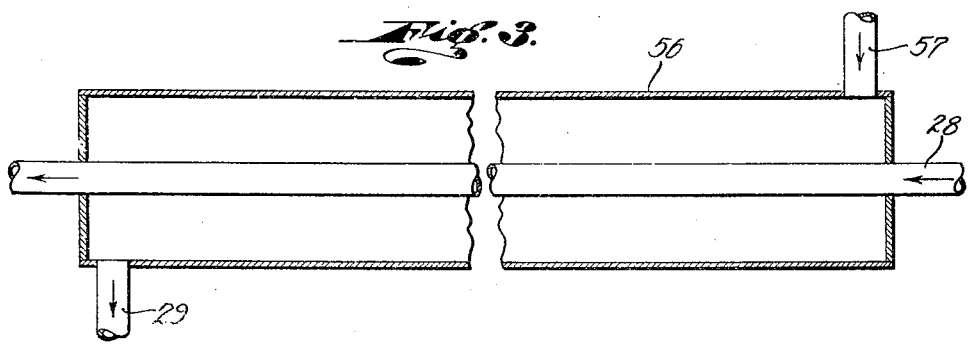

The various objects and features of my invention will be fully understood from the following detailed description of typical preferred forms and applications of my invention, throughout which description reference is made to the accompanying drawings, in which:

Fig. 1 is a diagrammatic view of one embodiment of the invention. Fig. 2 is an enlarged horizontal detailed sectional view taken as indicated by line 2—2 on Fig. 1, illustrating the heat exchangers. Fig. 3 is an enlarged vertical detailed sectional view taken as indicated by line 3—3 on Fig. 1, illustrating the means for cooling the liquid refrigerant prior to its delivery to the expansion valve. Fig. 4 is an enlarged fragmentary detailed sectional view of the automatic defrosting valve, with the valve proper in longitudinal cross section. Fig. 5 is an enlarged side elevation of the manually operable defrosting valve. Fig. 6 is an enlarged fragmentary vertical sectional view illustrating a part of the evaporator and showing the automatic damper control for the defrosting means. Fig. 7 is an enlarged fragmentary plan view of the switch mechanism shown in Fig. 6. Fig. 8 is a fragmentary view illustrating a timer means for the electric valve circuit and Fig. 9 is an enlarged vertical detailed sectional view of an improved absorber which may be embodied in the apparatus of the invention.

The apparatus of the invention, as illustrated in Figs. 1 to 7, inclusive, may be said to comprise, generally, a compartment C to be cooled or refrigerated; an evaporator 10; an air circulating means 11 for cooling or refrigerating the compartment C; a refrigerant circulating system comprising a compressor 12, a condenser 13, one or more heat exchangers 14, and a liquid receiver 15; a cooling system comprising an evaporative cooler 16, means 17 for circulating the cool water for the cooler 16 through the heat exchangers 14, etc. and means 18 for circulating air through the cooler 16, condenser 13, etc.; and an automatic defrosting means 19 for the evaporator 10.

The compartment C to be cooled or refrigerated may vary greatly in different applications of the invention. As diagrammatically illustrated in the drawings, the compartment C is defined by suitably insulated walls 20. An air duct 21 passes upwardly through the lower wall 20 of the compartment C and an air duct or opening 22 is provided in this lower wall in spaced relation to the duct 21. It is to be understood that the compartment C may be constructed and provided with means for directing the cooling or refrigerating air as may be required.

The system or means for circulating cool or cold air through the compartment C operates to continuously circulate or recycle air through the compartment, drawing air through the opening 22, cooling or refrigerating the air and then driving it through the duct 21 back into the compartment C. This means includes a passage 23 connecting the duct 21 and opening 22. The passage 23 may be defined by a thermally insulated wall 24 which, in the case illustrated, depends from the lower wall 20 of the compartment C. The evaporator 10 and the air circulating means 11 are positioned within the passage 23.

The evaporator 10 may be varied in design and construction as operating conditions may require but is preferably of the type through which air may be drawn or circulated. In the case illustrated, the evaporator 10 comprises spaced horizontal pipes 24ª connected at their ends by return bends 25 and joined and related to constitute a continuous coil or conduit. The pipes 24ª are supported adjacent the return bends 25 by a housing or end plates 26. An expansion valve 27 of suitable type is provided at the upper end of the evaporator conduit and a refrigerant return line 28 extends from the lower end of the evaporator coil or conduit. A line 29 supplies liquid refrigerant to the expansion valve 27 and evaporator 10, as will be later described in more detail. The evaporator 10 is positioned and proportioned to leave an air passage or channel 30 on at least one side of the evaporator. In the arrangement illustrated, the air channel 30 occurs above the evaporator 10, the evaporator being spaced some distance below the upper wall of the passage 23. It is to be understood that the evaporator 10 is formed so that it readily conducts or passes air moving through the passage 23 and that the evaporator may be formed and positioned so that air may pass around its several sides. The evaporator 10 is preferably spaced between the ends of the air passage 23.

The air circulating means 11 produces a movement of air through the passage 23 and thus provides for the circulation of refrigerated or cooled air through the compartment C. As diagrammatically illustrated, the means 11 comprises a centrifugal type blower having a housing inlet 31 at one end of the passage 23 and having its outlet at the duct 21. The shaft of the blower or means 11 extends through the wall 24 and the projecting portion of the shaft carries a pulley 32 so that the blower may be driven by the power means of the apparatus, as will be later described. The evaporator 10 and the means 11 are positioned and related so that the bulk of the air moved through the passage 23 by means 11 is obliged to pass through or immediately around the evaporator 10.

The compressor 12 operates to circulate refrigerant through the condenser 13, the heat exchangers 14, the liquid receiver 15, the evaporator 10 and the other elements of the refrigerant handling circuit. In practice, the apparatus may embody any selected type of compressor suitable for operation by a motor or engine. In the drawings I have shown a conventional compressor 12 which may be considered of the cylinder and piston type and the compressor 12 is equipped with a drive pulley 33. The compressor 12 is driven by a selected power means. In the preferred form of the invention a single power means, such as a motor or internal combustion engine, may serve to drive the air circulating means 11, the compressor 12, the water circulating means 17 and the air circulating means 18. In the case illustrated in the drawings, the single power means is in the nature of a selected form of engine 34. The engine 34 drives a common drive shaft 35 through the medium of a suitable centrifugal clutch 36 which relieves the engine of the operating load at the time of starting and until the engine has gained sufficient speed to assume the main load. A pulley 37 is fixed on the shaft 35 and a belt 38 operates over the pulleys 33 and 37 so that the compressor 12 is driven by the engine 34.

The air circulating means 11 is driven by a belt 161 operating over the pulley 32 and a pulley 162 fixed on the common drive shaft 35.

The compressor 12, the engine 34 and the means 17 and 18 are preferably positioned in one end portion of an elongate tunnel or passage 39. This passage 39 extends below or under the compartment C and the passage 23. The passage 39 is preferably closed throughout except at its opposite ends. The ends of the passages 39 may be provided with suitable grills or louvers 40. Where the apparatus is installed on a vehicle, such as a bus or truck, the passage 39 may have its open ends at opposite sides of the vehicle and the grills or louvers may be constructed so that movement of the vehicle creates or assists in creating a movement of air through the passage. In other cases it may be desired to arrange the apparatus so that the passage 39 extends longitudinally of the vehicle, in which case, it is preferred to arrange the parts so that the end of the passage 39 most remote from the engine 34 receives the air flow resulting from motion of the vehicle.

The condenser 13 is arranged in the passage 39 and receives the refrigerant under pressure from the compressor 12. The condenser 13 subjects the refrigerant to the heat exchange action of the cold air driven from the evaporative cooler 16 and it is preferred to arrange the condenser 13 in the passage 39 some distance in front of the compressor 12, that is, toward the cooler 16. In accordance with the broader aspects of the invention, the condenser 13 may be of selected or desired construction, it being preferred however to employ a type of condenser which provides for a free flow of the cooling air. I have shown the condenser 13 of the same construction or type as the above described evaporator 10. A line 41 from the high pressure side of the compressor 12 delivers the refrigerant to the upper ends of the condenser coil.

It is a feature of the invention that one or more heat exchangers 14 are connected in series relation with the condenser 13 to provide for the exchange of heat between the refrigerant leaving the condenser and the water of the evaporative cooling system to assure the complete condensation of the refrigerant and to increase the efficiency in the refrigerating action. There may be as many heat exchangers as required in a given installation. In the particular case illustrated, there are two like heat exchangers 14. It is preferred to position the heat exchangers 14 in the passage 39 so that there may be an additional exchange of heat between the refrigerant and the cool air travelling through the passage 39. I have shown the heat exchangers 14 in the lower portion of the passage 39 in front of the condenser 13.

Each heat exchanger 14 includes a tank or container 42. The container 42 may be elongate and cylindrical. Transverse partitions 43 extend across the interiors of the containers 42 and are spaced from the opposite ends of the containers to define main chambers 44 and end manifolds or chambers 45, see Fig. 2. It is preferred to circulate the refrigerant through the main chambers 44 of the heat exchangers 14. The discharge line 46 from the condenser 13 communicates with one end portion of the main chamber 44 of one heat exchanger 14. A connecting line 47 communicates with the other end portion of said chamber 44 and has communication with the corresponding end portion of the chamber 44 in the other heat exchanger 14. A pipe or line 48 communicates with the other end portion of the last named chamber 44 and extends to the liquid receiver 15. It will be seen that this arrangement provides for the passage of the refrigerant through one chamber 44 and then through the other chamber 44. It is preferred to have the line 47 lead from the bottom of the first chamber 44 to the upper part of the second chamber 44 to prevent the trapping or pocketing of liquid in the chambers.

The end chambers 45 of the heat exchangers 14 constitute manifolds for the cooling water. Multiplicities of tubes 49 have their ends sealed in openings 50a in the partitions 43 and extend through the main chambers 44 in spaced relation to connect the end chambers 45 of their respective heat exchangers, see Fig. 2. There is preferably sufficient tubes 49 to be spaced throughout the entire extents of the main chambers 44. A connecting pipe 50 has communication with corresponding end chambers 45 of the two heat exchangers. A cold water supply pipe 51 communicates with the other end chamber 45 of one heat exchanger and a water discharge pipe 52 communicates with the corresponding end chamber 45 of the other heat exchanger. It will be seen how the cold water flows through the chambers 45 and tubes 49 of the two heat exchangers 14. The piping is such that the cold water flows in a counter direction to the flow of the gas in the heat exchangers. The multiplicities of tubes 49 and the partitions 43 present extensive surfaces for the exchange of heat between the refrigerant and the circulating cold water. The heat exchangers 14 operate to assure completion of the condensation of the refrigerant and serve to appreciably lower the temperature of the refrigerant and thus increase the efficiency of the refrigerating action.

The liquid receiver 15 receives the liquid refrigerant from the exchangers 14 and subjects the refrigerant to a further heat exchange action. A receiver 15 is positioned in the passage 39 adjacent and behind the evaporative cooler 16 so that the evaporative cooling action of the cooler 16 is most effective in lowering the temperature of the refrigerant passing through the receiver. The receiver 15 may be varied considerably in construction. As illustrated, the receiver 15 comprises upper and lower manifolds 53 and 54, respectively, and a multiplicity of tubes 55 extending between and connecting the manifolds 53 and 54. The tubes 55 are spaced apart to permit the free passage of the cold air from the cooler 16 through the receiver 15.

The invention further provides means arranged in series relation with the liquid receiver 15 for subjecting the liquid refrigerant to further heat exchange action or cooling before it is delivered to the expansion valve 27. This means includes a container or vessel 56 spaced below the receiver 15. The vessel 56 is preferably an elongate structure of substantial diameter and capacity. A line 57 extends from the lower manifold 54 of the receiver 15 and communicates with one end portion of the vessel 56. The above mentioned high pressure line 29 of the evaporator 10 has communication with the other end portion of the vessel 56. The low pressure line or return line 28 from the evaporator 10 passes longitudinally through the vessel 56. While I have shown the pipe or line 28 as being straight within the vessel 56, it is to be understood that it may be in coil form in the vessel, if desired. The line 28 continues on from the vessel 56 to the low pressure side of the compressor 12. The vessel 56 is quite large in capacity so that there is a slow movement of the liquid refrigerant through the interior of the vessel. This refrigerant travelling through the vessel 56 is cooled by the cold gaseous refrigerant flowing through the line 28, there being a substantial exchange of heat between the liquid refrigerant in the vessel 56 and the gaseous refrigerant in the line 28. Further, as will be later described, the vessel 56 is submerged in the water of the evaporative cooling system so that there is an exchange of heat between the liquid refrigerant in the vessel 56 and the cooling water.

It will be observed that the high pressure side of the refrigerant handling system embodies a series of devices or units for condensing and then pre-cooling the refrigerant before the refrigerant is delivered to the expansion valve 27. The condenser 13 and the heat exchangers 14 are connected in series relation to condense the refrigerant leaving the high pressure side of the compressor 12 and to subject the refrigerant to an initial heat exchange. The liquid receiver 15 and the pre-cooling vessel 56 are likewise connected in series relation, one with the other, and this pair of elements is connected in series relation with the condenser 13 and heat exchangers 14. The refrigerant flowing through the receiver 15 has its temperature markedly reduced by the cooling effect of the evaporative cooler 16, the receiver being in the direct path of the cold air leaving the cooler. The refrigerant thus cooled in the receiver 15 is further cooled or lowered in temperature as it flows through the vessel 56, there being a substantial heat exchange between the liquid refrigerant in the vessel 56 and the returning gaseous refrigrant flowing through the pipe 28, which leads from the evaporator 10.

The evaporative cooling system of the invention serves to cool the engine 34, the compressor 12, the condenser 13, the heat exchangers 14 and the liquid receiver 15, maintaining a stream of cold air flowing through the passage 39 to cool these several mechanisms and to bring about a highly desirable heat exchange action for the refrigerant flowing through the condenser 13, the heat exchangers 14 and the receiver 15. Further, the evaporative cooling system maintains a continuous circulation of cold water which flows through the heat exchangers 14 to absorb heat from the refrigerant moving therethrough and which maintains a bath of cold water around the vessel 56 for the additional cooling or chilling of the liquid refrigerant passing through the vessel. The water of the evaporative cooling system is also utilized to defrost the evaporator 10, as will be later described.

The evaporative cooler 16 constitutes the primary element of the cooling system and is preferably positioned at or in the entrance of the air passage 39. The cooler 16 may be varied in construction without departing from the invention. In the construction illustrated, the cooler 16 comprises a primary pack 58 of excelsior, or the like, which is permeable to the air and which is supplied with water. The pack 58 is carried by a suitable support or framework 59 at the inlet end of the passage 39 and is provided at its upper end with a perforated trough 60. A secondary air permeable pack 61 is spaced behind or inwardly of the primary pack 58 and contains excelsior or similar material to wash or scrub the air for the purpose of removing excess moisture and water particles therefrom.

The means 17 is the water circulating means of the evaporative cooling system. The means 17 comprises a suitable pump 62 driven by the shaft 35 through a suitable belt and pulley drive 63. The intake or low pressure side of the pump 62 has a line 64 which extends to a sump 65 below the evaporative cooler 16. The above mentioned line 51 extends from the high pressure side of the pump 62 to the second heat exchanger 14. The above mentioned line 52 extends from the first heat exchanger 14 to the water supply pipe 65ᵃ of the evaporative cooler 16. A control valve 73 of the defrosting means 19 is interposed between the lines 52 and 65ᵃ, as will be later described in more detail. The supply pipe 65ᵃ extends upwardly to the trough 60 and discharges the water into the trough. The water thus supplied to the trough 60 falls or runs through the pack 58 being distributed by the trough to thoroughly and continuously wet the contents of the pack. The excess water, that is the water that is not evaporated from the pack 58, returns to the sump 65. The sump 65 is supplied by a water supply pipe 66 controlled by a valve 67 which serves to maintain the required water level in the sump. The valve 67 is an electrically operated solenoid valve operable to put the low pressure line 64 of the water pump 62 either in communication with the sump 65 or the water supply line 66. The valve 67 has two spaced ported partitions 140 and 141 and includes a movable stem 142 having a valve head 143 cooperable with the partitions 140 and 141 to close their respective ports. The valve 67 is interposed in the line 64 in such a manner that the portion of the line 64 communicating with the sump 65 and the portion of the line 64 extending to the pump 62 communicate with the interior of the valve at longitudinally spaced points, the portion of the line 64 extending to the pump communicating with the valve at a point between its partitions 140 and 141 and the portion of the line 64 communicating with the sump 65 communicating with one end portion of the valve. The pipe 66 communicates with the other end of the valve 67. The pipe 66 leads to any selected or appropriate source of water supply. A solenoid coil 144 operates the valve stem 142.

A float 145 is responsive to the level of the water in the sump 65 and operates a lever 146. The lever 146 controls a switch which in turn governs the solenoid coil 144. One lead of the energizing circuit 147 of the solenoid coil 144 has spaced contacts 148. One contact 148 is stationary and the other is operated or moved by the lever 146. Under normal operating conditions, the valve head 143 cooperates with the partition 141 to close off communication between the supply line 66 and the pipe 64. When the level in the sump 65 drops below a given point the float lever 146 brings the movable contact 148 into engagement with the stationary contact to complete the energizing circuit of the coil 144. Upon energization of the coil 144 the valve head 143 is moved to the position where it closes the partition 140 and puts the pump line 64 in communication with the supply line 66. The pump 62 now draws fluid from the supply line 66 and circulates the water through the cooling system. The level in the sump 65 gradually rises and when it reaches a given point the contacts 148 open to break the circuit to the coil 144 and the valve 67 returns to its normal condition with the partition 141 closed and the partition 140 open. A spring 160 is provided to return the valve 67. The water supply means maintains an ample supply of water in the cooling system. It is to be observed that the automatic float controlling water supply system is operable to draw the water from a tank or source of supply below the level of the sump 65 and other parts of the system. With the valve 67 in the position where the pipe 64 is in communication with the pipe 66 the pump 62 serves to draw or pump the water from the source of supply wherever the same may be. The water level of the sump 65 is such that the above described vessel 56 is at all times fully submerged in the cooling water.

The means 18 operates to maintain a continuous flow or movement of air through the passage 39. In accordance with the invention the means 18 is driven by the engine shaft 35. A partition 68 may extend across the passage 39 at a point between the compressor 12 and the condenser 13. The partition 68 has an opening 69 of substantial capacity and the means 18 comprises a blower 70 arranged at the opening 69 to produce a movement of air therethrough. The blower 70 is preferably of the centrifugal type and is fixed on the shaft 35. The blower 70 is of sufficient capacity to maintain a continuous and substantial flow of air through the passage 39. This air flow through the pack 58 evaporates the water contained in or flowing through the pack and thus brings about the well known evaporative cooling action. The resultant cold air leaving the cooler 16 flows across and through the liquid receiver 15, the heat exchangers 14 and the condenser 13 to provide the cooling or heat exchange actions in these elements, as described above.

The defrosting means 19 utilizes the water which has been heated during its passage through the heat exchangers 14 for the defrosting of the evaporator 10. In the embodiment of the invention specifically illustrated in Figs. 1, 4 and 7 of the drawings, the defrosting means is entirely automatic, being under the control of the air moving through the passage 23 and being responsive to a given appreciable increase in the resistance to movement of the air through the evaporator 10. The defrosting means 19 includes a water pipe 71 having one or more discharge nozzles 72 directed downwardly toward the evaporator 10. The nozzles 72 are operable to spray the warm water over the several pipes or tubes 24 of the evaporator 10. The pipe 71 extends to a valve 73 which is interposed between the pipes 52 and 65ª. In this form of the invention the valve 73 is an electrically operated three-way valve adapted to place the pipe 52 in communication with the pipe 65ª or the pipe 71. As best shown in Fig. 4, the valve 73 is a substantially balanced reciprocating type valve comprising a cylinder body 74 provided with a pair of spaced transverse partitions 75. One partition 75 has an axial port 76 and the other partition has a similar port 77, the ports being provided with opposed seats. The pipe 52 communicates with the interior of the valve body 74 at a point between the spaced partitions 75. The pipe 65ª which leads to the evaporative cooler 16 communicates with one end portion of the body 74, while the pipe 71, which delivers water to the nozzles 72, communicates with the other end portion of the valve body. A stem 78 extends through one end of the body 74 and passes through the port 77. A valve head 79 is provided on the inner end of the stem 78 and is operable to close the ports 76 and 77. The valve stem 78 is operated by a solenoid coil 80. The coil 80 is operable to move the stem 78 to the position where it closes the port 77 and a spring 81 bears against the outer end of the stem 78 to move the head 79 to the position where it closes the port 76.

The automatic control of the defrosting means 19 comprises a damper or pivoted blade 82 and a switch mechanism operated by the blade 82 to control the solenoid 80. The blade 82 is arranged to be operated by or under the control of the air flowing through the passage 30 above the evaporator 10. In the embodiment of the invention illustrated, the blade 82 is supported along its upper edge by a hinge 83 on the upper wall of the passage 30. The hinge 83 allows the blade 82 to swing between a substantially vertical depending position and a position where it slopes upwardly and rearwardly. When the blade 82 depends straight down its lower edge is at or adjacent the top of the evaporator 10 so that the blade substantially closes off the air passage 30. It is preferred to yieldingly hold the blade 82 in the closed depending position. A spring 84 yieldingly urges the blade 82 to the closed position. When the evaporator 10 gathers sufficient condensation or snow to appreciably resist or diminish the flow of air through it, the air is obliged to flow through the passage 30 and when the air flow is diverted into the passage 30 it raises or swings the blade 82 upwardly and rearwardly.

The switch mechanism of the defrosting means 19 is operated to complete an energizing circuit to the coil 80 when the blade 82 is swung upwardly to a predetermined position so that the valve 73 is operated to deliver the warmed water to the nozzles 72 for the purpose of defrosting the evaporator 10. The switch of the means 19 may be varied considerably in design and construction without departing from the invention. In the case illustrated, the switch comprises a slide 85 carried by spaced guides 86 suitably mounted at the exterior of the passage 23. A projecting arm 87 on the slide 85 carries a contact 88 which is engageable with a stationary contact 89. The energizing circuit of the valve coil 80 includes a power lead 90 which extends directly to one terminal of the coil 80 and a second power lead 91 which extends to the contact 88. A lead 92 extends from the stationary contact 89 to the second terminal of the coil 80. When the contact 88 of the shiftable slide 85 engages the contact 89, the energizing circuit is completed to the coil 80 and the valve head 79 is moved to the position where the pipe 71 is put into communication with the pipe 52 so that water is supplied to the nozzles 72. The slide 85 has a pair of horizontally spaced projecting fingers 93 and 94. A rod 150 is fixed to the hinge portion of the blade 82 and passes through an opening 151 in the wall 24. The rod 150 is of fiber, or the like, so that it does not freeze in the opening 151 and projects between the spaced fingers 93. The finger 93 is positioned in front of the rod 150, while the finger 94 is behind the rod. The finger 94 is spaced some distance rearwardly from the rod 150. When the blade 82 is in its normal substantially vertical position the rod 150 is in engagement with the front finger 93 and the slide 85 is in its normal position where the contact 88 is out of engagement with the stationary contact 89. As the snow gathers in the evaporator 10 there is an increase in the air flow through the passage 30 and the blade 82 is swung rearwardly. Ultimately the blade 82 is swung to a position where the rod 150 engages against the finger 94 and the air flow acting on the blade 82 forces the slide 85 rearwardly to bring the contact 88 against the contact 89. This results in the delivery of the warm water to the nozzles 79 and the warm water discharged over the pipes of the evaporator 10 rapidly defrosts the evaporator 10. As the evaporator 10 becomes defrosted there is an increase in the flow of air through the evaporator and the spring 84 overcomes the reduced air flow through the passage 30 to swing the blade 82 toward its normal position. Owing to the spacing of the fingers 93 and 94 the blade 82 must swing back a substantial distance before the rod 150 comes into engagement with the front finger 93. The spring urged rod 150 pressing forwardly against the front finger 93 finally moves the slide 85 to the normal position where the contact 88 is disengaged from the contact 89. This completes the defrosting operation and results in deenergization of the coil 80 so that the water is again delivered to the pipe 65 of the evaporative cooler for the normal operation. In practice, the defrosting operation just described, requires only a very short time for its completion.

In accordance with the invention the water sprayed between the evaporator 10 to defrost the same and the melted snow or liquid condensate from the condenser 13 is returned to the sump 65. A water return line 96 extends from the lower part of the passage 23 to the sump 65. The portion of the passage 23 below the evaporator 10 is shaped to receive the liquid falling from the evaporator and may be shaped or formed to direct this water to the drain pipe 96. The lower portion of the water return pipe 96 is submerged in the water of the sump 65 to isolate the passages 23 and 39. The cold water returning through the pipe 96 from the evaporator 10 reduces the temperature of the water in the sump 65 and thus increases the efficiency of the evaporative cooling system and cold water circulating system.

Fig. 5 of the drawings illustrates a manually operable valve 73ª which may replace the valve 73, described above. The valve 73ª of Fig. 5 may be manually operated to cause the delivery of the water to the nozzles 72 for the defrosting operation. The valve 73ª may be substantially the same as the valve 73 and may be connected in the lines 52, 71 and 65ª in the same manner. The operating stem 78ª of the valve 73ª projects from the valve body and is equipped with a handle 100. The valve 73ª is positioned so that its handle 100 is readily accessible to the operator. It will be seen how the valve 73ª may be operated between the position where the pipe 52 is in communication with the pipe 65ª for the normal delivery of water to the evaporative cooler 16 and the defrosting position where the water is delivered to the pipe 71 to defrost the evaporator 10.

Fig. 8 illustrates a timing means that may be interposed in the enrgizing circuit of the coil 80 to replace the switch means illustrated in Figs. 1 and 7 or to supplement the switch means of Figs. 1 and 7. In the structure of Fig. 8 the energizing line 90 extends to one terminal of the valve coil 80 as in the previous form of the invention. The other power line 91 extends to an automatic timer 101. The automatic timer 101 may embody a suitable spring wound clock works contained in a case 102, the details of the clock works being omitted from the present disclosure as such mechanisms are well known. The case 102 of the timer 101 carries a conductive ring 103 provided with a plurality of circumferentially spaced contacts 104. The shaft 105 of the clock works carries a contact 106 of the wiping type or brush type for successively engaging the spaced contacts 104. The line or conductor 92 extends from the contact 106 to the second terminal of the valve coil 80. The timer 101 may be such that the contact 106 engages a contact 104 at regular intervals, for example, every hour, every two hours, every three hours, or the like. With the contact 106 in engagement with a contact 104 the coil 80 is energized to operate the valve head 79 to the position where water is supplied to the nozzles 72 to defrost the evaporator 10. The contact 106 remains in engagement with the contact 104 for a sufficient period to assure full defrosting of the evaporator 10. If desired, the automatic timer 101 may be supplemented by a manual switch 107. The switch 107 is connected in a bridge 108 connecting the lines 90 and 92 to shunt out the timer 101. The switch 107 may be employed when it is desired to defrost the evaporator 10 when the contact 106 is spaced between a pair of adjacent contacts 104. The switch 107 may be located in the driver's compartment of the vehicle to be accessible for operation while the vehicle is in operation.

Fig. 9 of the drawings illustrates an absorber means which may be embodied in the refrigerating system when ammonia, or the like, is to be employed as the refrigerant. The absorber means of Fig. 9, when employed, replaces the condenser 13 and the heat absorbers 14. The other elements of the system, described in detail above, may remain the same. The absorber means of Fig. 9 comprises a tank 110 positioned in the passage 39 to be cooled by the evaporative cooler 16. Spaced longitudinal cooling fins 111 are provided on the absorber tank 110. The absorber tank 110 contains a body of aqueous ammonia 112 or other suitable aqueous refrigerant solution whose upper surface is spaced below the upper wall of the tank to leave a vapor surface S. In this form of the invention the intake or low pressure pipe 28ª of the compressor 12 has communication with the vapor space S of the absorber. The inner end of the pipe 28ª is open to receive the vaporous or gaseous refrigerant from the space S.

The absorber means of Fig. 9 illustrates a novel dehydrator for reducing the proportion of water vapor drawn into the refrigerant handling system. This dehydrator comprises a hollow shell 113 supported in the space S to surround that portion of the pipe 28ª which projects into the tank 110 and to enclose the receiving end of the pipe. The upper wall of the shell 113 has inlets 114 for the refrigerant vapor and the lower wall of the shell has outlets 115 for the water which is returned to the aqueous refrigerant solution 112. A coil or pipe carrying the returning gaseous refrigerant is associated with or passes through the shell 113 to condense the water from the refrigerant vapor at the point of intake of the vapor to the pipe 28ª. In practice, the pipe or line 28 which carries the returning gaseous refrigerant from the evaporator 10 has a portion 28ᵇ passing longitudinally through the shell 113. The cold refrigerant passing through the pipe 28ᵇ materially reduces the temperature within the shell 113 causing the water content of the refrigerant vapor to condense within the shell. The water thus removed from the refrigerant vapor discharges through the openings 115 into the body of aqueous ammonia 112. The condensing of the water from the gaseous refrigerant materially increases the efficiency of the system.

Where the absorber means of Fig. 9 is employed the high pressure refrigerant line 41ª extending from the high pressure side of the compressor 12 extends to the tank 110 and has a coil 116 within the tank which is submerged in the upper portion of the body of aqueous ammonia 112. A line 48ª continues from the coil 116 to the upper manifold 53 of the liquid receiver 15. The coil 116 constitutes a condenser. The compressor 12, having drawn the gaseous refrigerant from the upper portion of the tank 110, forces it through the condenser coil 116. Condensation of the refrigerant occurs in the condenser coil 116. The condensation of the gas in the coil 116 results in the conversion of the latent heat of the refrigerant to sensible heat in the aqueous refrigerant solution 112. The sensible heat of the liquid solution is reconverted to latent heat as the ammonia or refrigerant evaporates from the surface of the liquid body 112 and from the surface of the submerged coil 116. The vapor or gaseous refrigerant thus driven from the liquid solution supplies the low pressure pipe 28ª of the compressor 12. There is an equal heat exchange between the condenser coil 116 and the body of liquid 112 serving to maintain a substantially constant vapor pressure in the tank 110.

The line 28, in addition to having the portion 28ᵇ within the dehydrator shell 113, has a discharge portion 117 disposed in the lower portion of the absorber tank 110. The discharge pipe 117 is provided with longitudinally spaced discharge openings 118 and extends horizontally within the tank 110. The discharge openings 118 provide for the discharge of the returning gaseous refrigerant into the aqueous solution 112. In accordance with the invention the water handling portion of the evaporative cooling system serves to reduce the temperature of that portion of the aqueous ammonia solution 112 which receives the vaporous refrigerant. The above described water handling pipe 51 extends to the tank 110 and has a coil 119 within the lower portion of the tank 110. In this form of the invention the water pipe 51 extends from the pump 17 to the tank 110 and then continues from its coil 119 to the valve 73 or 73ª, as the case may be. The cooling coil 119 is positioned above the discharge pipe portion 117 to cool that zone of the liquid 112 which receives the returning vaporous refrigerant. The cooling medium or water flowing through the coil 119 reduces the temperature of the liquid above the discharge opening 118 to greatly increase the absorptivity of the solution. Accordingly, the refrigerant gas may be absorbed to the extent that a solution of high concentration by weight is obtained. Furthermore, the cooling medium or water of the coil 119 serves to absorb the heat created incident to the absorption of the gaseous refrigerant by the liquid, there being a direct and immediate heat exchange accompanying the absorption of the gaseous refrigerant thereby increasing the efficiency of the system.

The absorber means of Fig. 9 further includes a baffle 120. The baffle 120 is spaced a short distance above the coil 119, being located between the coils 116 and 119. A down turned lip 121 continues along the margin of the baffle 120, the baffle 120 is preferably imperforate. The horizontally disposed baffle 120 serves to trap and retain any free gaseous refrigerant that may be passing up through the liquid and thus retains the free refrigerant in contact with the cooled aqueous solution until absorbed by the same. The baffle 120 is spaced from the walls of the tank 110, being supported by horizontal supporting strips 122. This disposition of the baffle 120 assists the formation of convection currents within the body of liquid 112. The cold air passing through the passage 39 and striking the exterior of the tank 110 produces convection currents in the liquid 112 and the baffle 120 positioned as just described assists in the maintenance of these convection currents. The gaseous refrigerant absorbed by the solution 112 is driven from the upper portion of the liquid body in a vapor state to be withdrawn by the low pressure pipe 28ª of the compressor 12. An absorber, of the general character illustrated in Fig. 9, is fully described and claimed in my copending application, Serial No. 356,916.

It is believed that the operation of the apparatus provided by the present invention will be readily understood from the foregoing detailed description. Referring now to the embodiment of the invention illustrated in Figs. 1, 4, 6 and 7, the engine 34 may be maintained in constant operation to drive the compressor 12, the blowers 11 and 70 and the pump 17. The refrigerant is forced from the compressor 12 through the condenser 13 and heat exchangers 14. The cold air moving through the passage 39 from the evaporative cooler 16 provides for the efficient condensing of the refrigerant in the condenser 13 and heat exchangers 14 and materially lowers the temperature of the refrigerant before it is delivered to the receiver 15. Furthermore, the cold water passing through the end chambers 45 and tubes 49 of the heat exchangers 14 greatly reduces the temperature of the refrigerant. Accordingly, the refrigerant is delivered to the liquid absorber 15 at a relatively low temperature. The temperature of the refrigerant is further reduced during its passage through the receiver tubes 55 and during its passage through the vessel 56 of the precooler. The returning gaseous refrigerant flowing through the pipe 28 and the cold sump water surrounding the vessel 56 are effective in bringing about a substantial reduction in the temperature of the refrigerant flowing through the vessel 56. The refrigerant is delivered to the expansion valve 27 at a relatively low temperature. The refrigerant delivered to the evaporator 10 by the expansion valve 27 has the well known cooling or freezing effect in the evaporator. The blower 11 maintains a continuous movement of air through the passage 23 and the air flowing through the evaporator 10 is reduced in temperature. Thus, a refrigerated air circulation is maintained through the compartment C.

After a period of use, varying with the different load conditions and atmospheric conditions, a considerable quantity of snow accumulates on the evaporator 10. This accumulation of condensate or snow gradually reduces or restricts the flow of air through the evaporator. When the air flow through the evaporator 10 has been reduced to a given extent the air by-passing through the passage 30 overcomes a resistance of the spring 84 and moves the blade 82 to a position where the slide finger 94 is engaged and moved by the blade. This movement brings the contact 88 into engagement with the contact 89, completing the circuit to the coil 80. Upon energization of the coil 80 the valve head 79 uncovers the port 76 and closes the port 77 so that the warmed water leaving the heat exchangers 14 is delivered to the nozzles 72. This warmed water spraying on the evaporator 10 quickly defrosts the evaporator. The water from the nozzles 79 and the melted snow returns through the pipe 96 to the sump 65. As the snow melts from the evaporator 10 the movement of air through the evaporator increases and in proportion the movement of air through the passage 30 decreases. Accordingly, the spring 84 overcomes the air movement and returns the blade 82 to its normal position. However, due to the spacing of the fingers 93 and 94 the slide 85 is not immediately restored when the blade 82 begins its return movement and is not moved to its normal position until the blade 82 approaches its normal position, whereupon the rod 150 engages the finger 93. When the blade 82 is restored to its normal position the slide 85 is shifted back to disengage the contact 88 from the contact 89 deenergizing the coil 80. Upon deenergization of the coil 80 the spring 81 restores the valve head 79 to the position where the port 77 is open and the port 76 is closed.

The apparatus of the present invention may be operated continuously and it is not necessary to discontinue the operation to defrost. The defrosting of the evaporator requires a minimum of time and results in but very little change in the temperature of the compartment C. The water of the evaporative cooling system and liquid cooling system is employed in the defrosting operation to the best advantage, increasing the general efficiency of the mechanism.

Having described typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A refrigerating apparatus comprising a refrigerant handling system including a relatively stationary evaporator and means for circulating refrigerant to and from the evaporator, a cooling system handling a liquid cooling medium, and including means for effecting an exchange of heat from the refrigerant being handled by the first named means and the cooling medium, and means responsive to the frost condition of the evaporator for discharging the cooling medium onto the evaporator to defrost the same.

2. In apparatus of the class described, a refrigerating system comprising an evaporator, a refrigerant handling system for circulating a refrigerant to and from the evaporator, a cooling system for circulating a cooling medium and including an evaporative cooler in which said medium is cooled, heat exchange means in which there is an exchange of heat from the refrigerant moving to the evaporator to the cooling medium, and automatic means for discharging the cooling medium from the heat exchange means onto the evaporator to defrost the same at spaced intervals, the last named means including a line for carrying the cooling medium to the evaporator to be discharged thereon, a valve controlling communication of said line with the cooling system, and automatic timer means for operating the valve.

3. In apparatus of the class described, a refrigerating system comprising an evaporator, a refrigerant handling system for circulating a refrigerant to and from the evaporator, a cooling system for circulating a cooling medium and including an evaporative cooler in which said medium is cooled, heat exchange means in which there is an exchange of heat from the refrigerant moving to the evaporator and to the cooling medium, and automatic means for discharging the cooling medium from the heat exchange means onto the evaporator to defrost the same at spaced intervals, the last named means including a line for carrying the cooling medium to the evaporator to be discharged thereon, a valve controlling communication of said line with the cooling system, means for producing a movement of air through the evaporator, and means for operating said valve in response to variations in the resistance to air movement through the evaporator resulting from frost accumulations on the evaporator.

4. In apparatus of the class described, a refrigerating system comprising an evaporator, a refrigerant handling system for circulating a refrigerant to and from the evaporator, a cooling system for circulating a cooling medium and including an evaporative cooler in which said medium is cooled, heat exchange means in which there is an exchange of heat from the refrigerant moving to the evaporator and to the cooling medium, and automatic means for discharging the cooling medium from the heat exchange means onto the evaporator to defrost the same at spaced intervals, the last named means including a line for carrying the cooling medium to the evaporator to be discharged thereon, a valve controlling communication of said line with the cooling system, means for causing a movement of air through the evaporator, and a part movable in response to said air movement upon the accumulation of a given amount of frost on the evaporator to control said valve.

5. In apparatus of the class described, a refrigerating system comprising an evaporator, a refrigerant handling system for circulating a refrigerant to and from the evaporator, a cooling means comprising an evaporative cooler, a system circulating a cooling medium to and from the cooler, heat exchange means employing said cooling medium to cool the refrigerant circulating to the evaporator, said system normally conducting the cooling medium from the heat exchange means to the cooler, and means for diverting the cooling medium, which is returning from said heat exchange means to the cooler and for spraying the same on the evaporator to defrost the evaporator.

6. An apparatus of the class described comprising a refrigerating system including an evaporator, a condenser, heat exchange means in series with the condenser, and means for circulating refrigerant through the condenser, heat exchange means and an evaporator, a cooling system comprising an evaporative cooler providing cool air for effecting an exchange of heat at the condenser, and circulating means for delivering a cooling medium to the cooler, where it is cooled and for circulating the medium from the cooler through the heat exchange means to effect an exchange of heat from the refrigerant to the medium, means for delivering said medium from the heat exchange means to the evaporator to defrost the evaporator, and means for returning the melted frost and medium from the evaporator to the circulating means.

7. An apparatus of the class described comprising a refrigerating system including an evaporator, a condenser, heat exchange means in series with the condenser, a liquid receiver, a pre-cooling vessel in series with the receiver, and means for circulating a refrigerant through the condenser, heat exchange means, receiver, vessel and evaporator, a cooling system including an evaporative cooler having a sump containing a cooling medium which submerges the vessel, the evaporative cooler providing cool air for effecting an exchange of heat at the receiver, and condenser, means for circulating said medium from the sump through the heat exchange means and back to the cooler, and means for delivering the medium from the heat exchange means to the evaporator to defrost the same.

8. In refrigerating apparatus, an evaporator, a compressor, an absorber tank containing a refrigerant solution, a line leading from the tank to the compressor to deliver gaseous refrigerant from the upper portion of the tank to the compressor, a line leading from the compressor to the evaporator to deliver the refrigerant to the evaporator, a line returning the refrigerant from the evaporator to the solution in the tank, a cooling system including a conduit carrying a cooling medium and passing through the liquid in the tank adjacent the point of discharge of the refrigerant therein to effect a heat exchange action, and means for delivering the cooling medium from said conduit to the exterior of the evaporator to defrost the same.

9. In refrigerating apparatus, an evaporator, a compressor, an absorber tank containing a refrigerant solution, a line leading from the tank to the compressor to deliver gaseous refrigerant from the upper portion of the tank to the compressor, a line leading from the compressor to the evaporator to deliver the refrigerant to the evaporator, a line returning the refrigerant from the evaporator to the solution in the tank, a dehydrator shell around a portion of the last named line and the refrigerant receiving portion of the first named line, a cooling system including a conduit carrying a cooling medium and passing through the liquid in the tank adjacent the point of discharge of the refrigerant therein to effect a heat exchange action, and means for delivering the cooling medium from said conduit to the exterior of the evaporator to defrost the same.

CARROLL W. BAKER.